2 Sheets—Sheet 2.

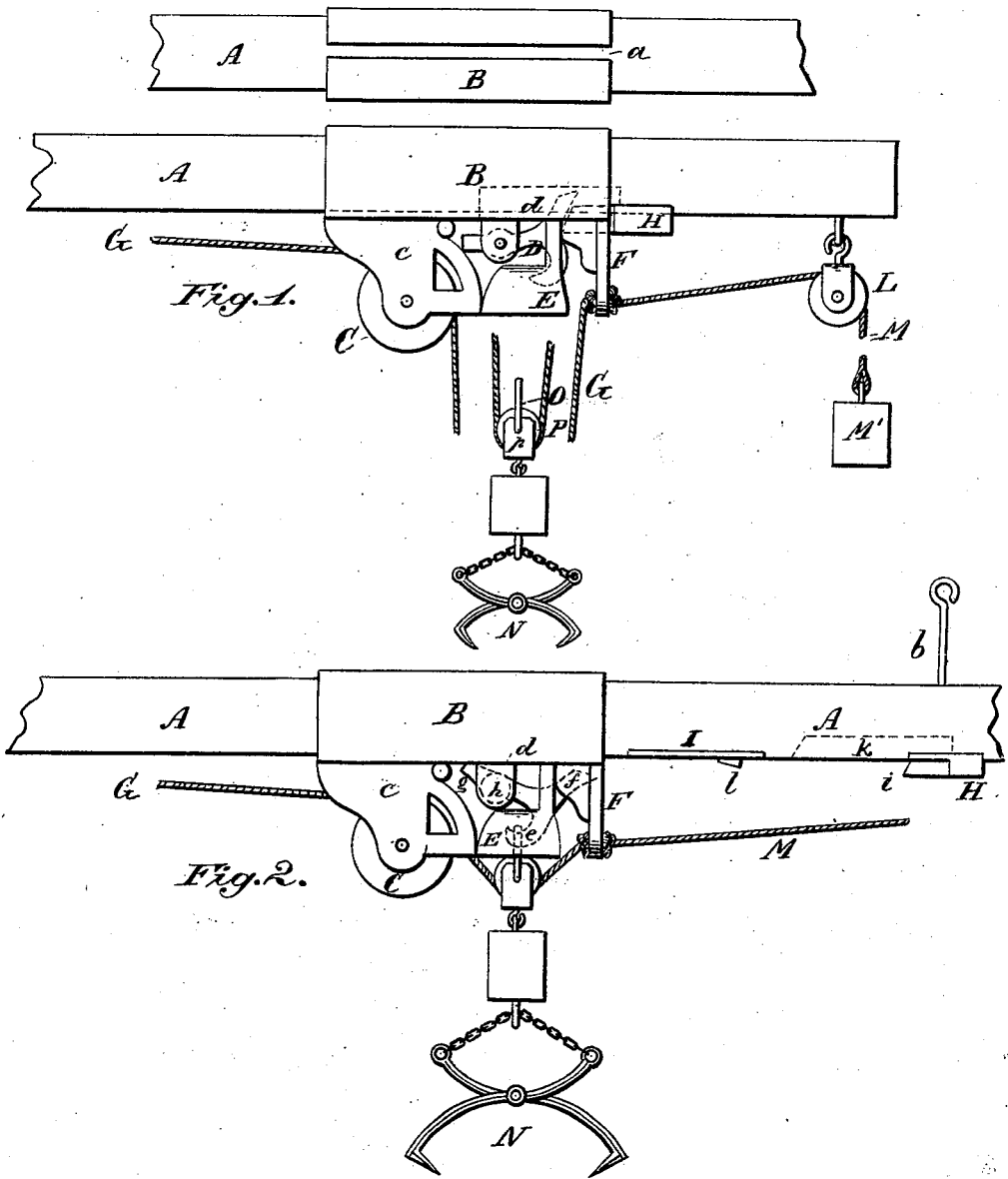

C. KISTNER.
Hay Elevator and Carrier.

No. 196,910. Patented Nov. 6, 1877.

Attest
E. E. Court
G. H. Morgan

Inventor:
Calvin Kistner,
by Louis Bagger & Co.
his Attorneys

UNITED STATES PATENT OFFICE.

CALVIN KISTNER, OF FREEPORT, ILLINOIS, ASSIGNOR TO W. G. & W. BARNES, OF SAME PLACE.

IMPROVEMENT IN HAY ELEVATOR AND CARRIER.

Specification forming part of Letters Patent No. 196,910, dated November 6, 1877; application filed September 24, 1877.

*To all whom it may concern:*

Be it known that I, CALVIN KISTNER, of Freeport, in the county of Stephenson and State of Illinois, have invented certain new and useful Improvements in Hay Elevator and Carrier; and I do hereby declare that the following is a full, clear, and exact description thereof, which will enable others skilled in the art to which it appertains to make and use the same, reference being had to the accompanying drawings, which form a part of this specification, and in which—

Figure 4:
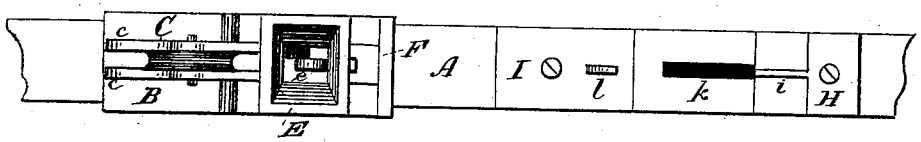
Figure 5:
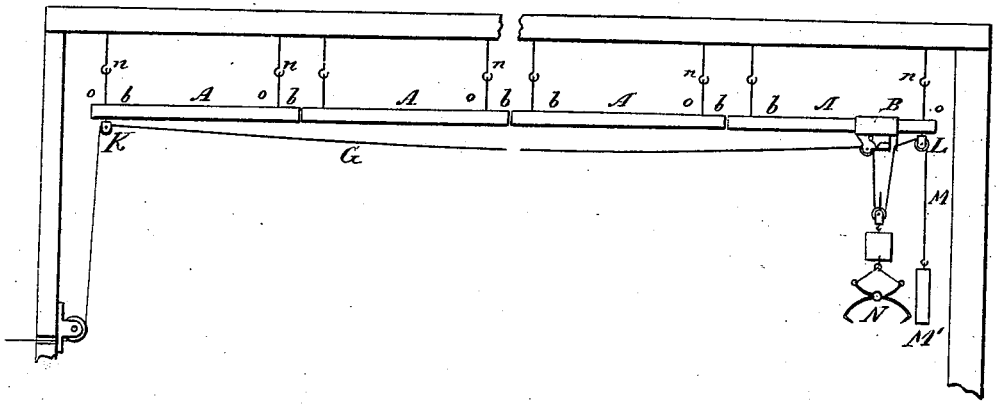
Figure 3:
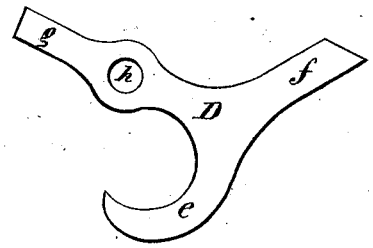

Figure 1 is a side elevation of a section of the track, showing the carriage with its attachments in position for charging the fork with hay from the floor or loaded wagon. Fig. 2 is a similar view, showing the position of the carriage after the fork, with its load, has been hooked onto it and is traveling on the track. Fig. 3 is a side view of the operating-dog detached. Fig. 4 is a view of the under side of the track-beam and carriage; and Fig. 5 shows the manner of suspending the adjustable and removable track-sections from under the ridge-beam or rafters of the barn or store-house.

Similar letters of reference indicate corresponding parts in all the figures.

My invention relates to hay elevators and carriers; and consists in an improved construction and arrangement of parts, which has for its object to simplify the mechanism of this class of devices, and thus to render them cheaper and more durable, and easily operated, substantially as I shall now proceed to describe more fully.

A is the track-beam, and B is the carriage. The latter consists of a sleeve, which slides easily upon the beam, and is slotted longitudinally in the top part or plate, as shown at *a*, so as to allow the carriage to pass the suspension-hooks *b*, which are secured at each end of each track-beam, and, besides, at intermediate places, as may be necessary. Secured upon, and projecting downward from, the sleeve B is a box or bearing, *c*, for the carriage-pulley C, another bearing, *d*, in which is pivoted the dog D, a tapering or trumpet-shaped hood, E, and a downwardly-projecting plate, F, to the lower point of which one end of the hoisting and drawing rope G is secured.

The dog D consists of a downward-projecting hook, *e*, and a short lever-arm, *f*, both of which are on one side of the fulcrum *h*, and a latch, *g*, projecting on the other side of the fulcrum. Being hung in this manner, dog D will, of its own weight, occupy the position in which it is represented in Fig. 2, unless operated by the stop-plate H. This consists of a metal plate adjustably secured in any suitable manner to the under side of the track-beam, and provided with a downward-projecting flange or step, *i*, sloping in front. The beam A has a mortise or recess, *k*, in front of and above the step *i*, and to the under side of the beam, at the other end of this slot, is secured another plate, I, having a downward-projecting beveled lug, *l*.

Plates H and I may, if preferred, be made in one piece, with a central slot corresponding to the mortise or recess *k*, and this recess may be made to extend the entire length of the track, forming one continuous groove from end to end of each section, so that plates H I may be adjusted at any suitable point upon the track under which the load to be removed is placed, above which it is desirable to stop the car. The under side of the sleeve or carriage B is also slotted at a point above the pivoted dog D, to allow the latch *g* and lever *f* to work against lug *l* and step *i*, respectively, for the purpose hereinafter stated, in describing the operation of the invention.

K is a pulley, secured at or near the end of the track, over which the draft-rope G is passed. L is another pulley, secured at the other end of the track, over which the pull-back rope M, for restoring the car to its starting-point, is passed. Rope M has a weight attached to one end, and the other end is secured in plate F, at the same point where the draft-rope is fastened.

It is obvious that the ropes G and M may be in one continuous piece, secured at a certain point in its length in the plate F.

The track on which the car travels is made up from a series of pieces, A, of suitable dimensions, each of which is provided with two hooks, *b b*, one at each end. A suitable number of these sections to form a track of the required length are suspended from the rafters of the barn by rods n, terminating in eyes o, as represented in Fig. 5.

When no longer required for use, the track may readily be taken down and stored away, and may be again put up ready for use, whenever desired, in a few minutes.

From the foregoing description, the manner of operating this invention will be readily understood. The carriage being at the end of its track, just above the load to be removed and stacked, the fork N, with its weight, which is secured in the block $p$ of pulley P, is lowered by its own gravity, and the fork charged with its load. This done, the team, which is hitched to the end of the draft-rope, is started, raising the fork with its load until the bail O of pulley P enters the hood E, which serves as a guide for it, and takes with the hook $e$ of dog D, while at the same time the top of the bail will tilt the dog on its fulcrum, and thereby release the latch $g$ from its stop-lug $l$, against which it abuts. The carriage, being thus released, travels on the track till the place for depositing its load has been reached, when the load is dropped by pulling a trip-cord attached to the fork, in the usual manner. The return of the carriage and fork is effected by rope M and weight M', and when the carriage reaches the stop-plate H the step $i$ of said plate will engage with the lever-arm $f$ of dog D, and tilt it up into the recess $k$ in the track-beam, thereby withdrawing hook $e$ from bail O of the fork-pulley, which, impelled by its weight, descends to the floor or wagon, where the fork is recharged. The beveled front end of lug $l$ permits the carriage, with its dog, to pass over it on the return trip, but prevents it from traveling back again until the bail of the fork-pulley strikes the dog, and thereby trips the latch from its lug.

Having thus described my invention, I claim and desire to secure by Letters Patent of the United States—

1. The combination of the slotted track-beams A with the stop-plate H, having beveled step $i$ reaching up into the slot in the track-beam, substantially as and for the purpose herein shown and described.

2. The combination of the slotted track-beams A, having the stepped plate H, with the catch-plate I, having beveled lug $l$, substantially as and for the purpose herein shown and described.

3. The combination of slotted sleeve B, having pivoted dog D, track A, and stop-plates H I, substantially as and for the purpose herein shown and described.

4. The combination of carriage B, having pivoted dog D, pulley-block $p$, having bail O, ropes G M, track A, and stop-plates H I, all constructed and combined to operate substantially as and for the purpose hereinbefore set forth.

In testimony that I claim the foregoing as my own I have hereto affixed my signature in presence of two witnesses.

CALVIN KISTNER.

Witnesses:
 WALTER G. BARNES,
 WILLIAM BARNES.